A. V. ROE.
SEAT SUPPORT.
APPLICATION FILED MAY 19, 1920.

1,362,042.

Patented Dec. 14, 1920.
2 SHEETS—SHEET 1.

A.V. ROE.
Inventor;
per:- Geo. A. Hutchinson
Attorney.

A. V. ROE.
SEAT SUPPORT.
APPLICATION FILED MAY 19, 1920.

1,362,042.

Patented Dec. 14, 1920.
2 SHEETS—SHEET 2.

A. V. ROE.
Inventor.
per:- Geo. H. Hutchinson
Attorney.

UNITED STATES PATENT OFFICE.

ALLIOTT V. ROE, OF BURSLEDON, ENGLAND, ASSIGNOR TO A. V. ROE & CO., LIMITED, OF MANCHESTER, ENGLAND.

SEAT-SUPPORT.

1,362,042.   Specification of Letters Patent.   Patented Dec. 14, 1920.

Application filed May 19, 1920. Serial No. 382,478.

*To all whom it may concern:*

Be it known that I, ALLIOTT VERDON ROE, a subject of the King of Great Britain, residing at Bursledon, Hampshire, England, have invented certain new and useful Improvements in Seat-Supports, of which the following is a specification.

This invention relates to supporting structures for seats and is especially applicable to the seats of automobiles and other vehicles.

The primary object of my invention is to provide a novel and improved seat support in the form of a spring framework hereinafter to be described, and a further feature resides in the means whereby an angular movement of the seat proper in relation to the said framework is employed to provide an adjustment to suit persons of various heights.

My invention consists in an improved seat support comprising a resiliently supported framework, pivotal means connecting a seat or seats to the said framework, and means for adjusting the position of the seat or seats angularly about its or their pivotal supporting axis.

The frames of my improved seat support may be constructed in any suitable material, but my preferred construction is particularly adapted to the use of light pressed steel members preferably of channel or other angular section.

By way of example, and in order that the nature of my invention may more readily be understood, I will now proceed particularly to describe a preferred embodiment, wherein pressed steel members are employed in the construction of the framework, reference being hereinafter made to the accompanying drawings.

In these drawings:—

Figure 2:
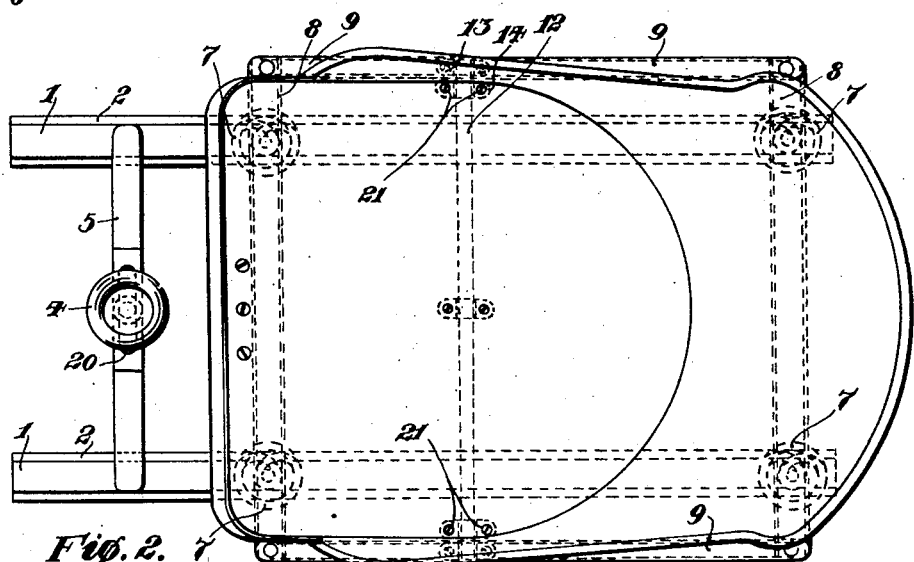
Fig. 2 is a plan view of the construction shown in Fig. 1.
Figure 3:
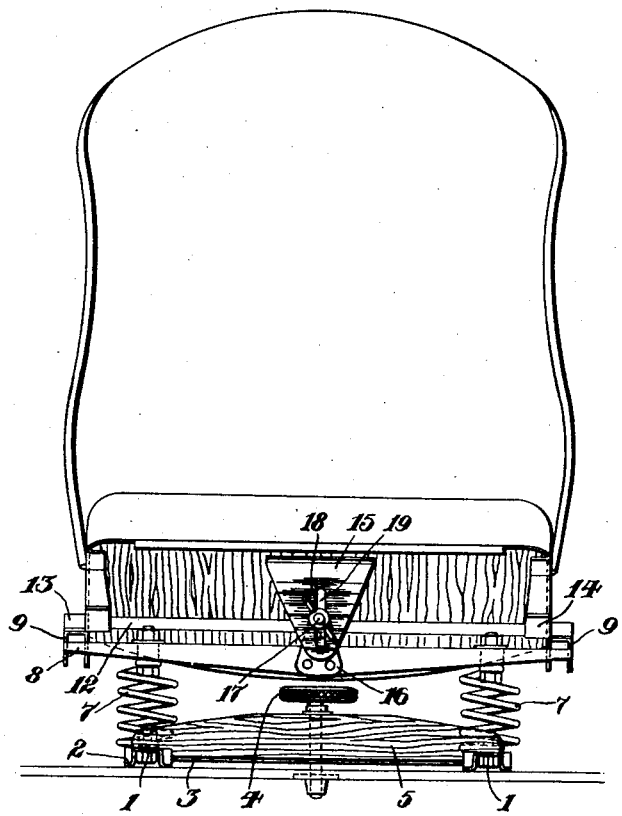
Fig. 3 is a front elevation.

In this embodiment the bottom frame comprises a pair of longitudinal members or runners 1 of channel section having their channel flanges outturned, as indicated at 2, in Figs. 2 and 3, into a plane parallel to the web of the channel so as to form bearing surfaces which rest upon the floor. These longitudinals are united by a plurality of channel section cross members 3, and may if desired be secured to the floor of a vehicle or the like in the manner described in my prior specification No. 366,280 filed the sixteenth day of March, 1920, and broadly indicated by reference numerals 4 and 5. For this purpose they may be extended forwardly of the seat in order to provide accommodation for the securing means, and the outturned portions of their flanges are slightly upturned at their extremities, as at 6, in order to facilitate sliding of the whole structure when the securing means are released.

To this bottom frame are attached the lower extremities of a plurality of helical springs 7, the points of attachment being preferably coincident with the point of junction between the longitudinal runners and the cross members above described.

To the upper extremities of these springs are secured a plurality of transverse frame members 8 which carry a pair of longitudinals 9 upon which the seat proper is pivoted.

Figure 1:
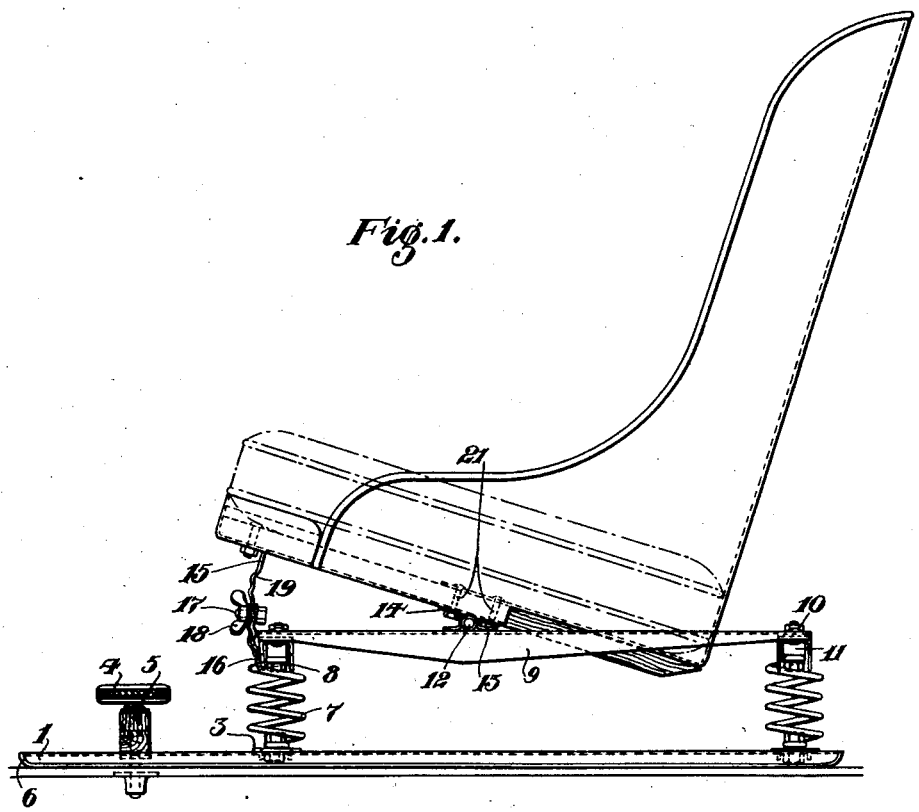
Figure 1 is a side elevation of a seat support constructed according to my invention.

The helical springs 7 may be secured to the longitudinals 9 by means of bolts and nuts 10 and distance pieces 11, as clearly shown in Fig. 1.

In my preferred construction I find it satisfactory to employ one front pair of springs and one rear pair, carrying respectively a front and a rear transverse member, and by attaching the longitudinals at points exterior to the points of attachment of said springs, as shown in Figs. 2 and 3, I am enabled to permit the seat proper to be accommodated substantially between said longitudinals without unduly restricting its width. It will thus be observed that the upper frame is of greater width than the bottom frame as defined by the position of the runners hereinbefore described, and this arrangement is particularly adapted to suit the shape of the automobile bodies and the like, of which the sides taper inwardly toward the floor level. Both the transverse members and the longitudinals of the upper frame may be conveniently comprised in pressings of channel section, which may have their flanges suitably tapered to provide greatest depth substantially in the regions of greatest bending moment.

The seat proper is preferably pivoted to the upper frame upon a transverse axis lying somewhat to the front of the midpoints between the extremities of the longitudinals. One convenient method of pivoting consists in rotatably mounting the bottom member of the seat upon a transverse circular bar or tube 12 having its ends secured to said longitudinals or to brackets 13 carried thereby, the pivotal connection between said seat bottom and said rod being effected by means of brackets 14 embracing said rod and secured to said seat bottom by bolts 21 or the like. By locating the pivotal axis intermediate the front and rear of the seat bottom—preferably near the middle thereof—I obtain an oscillatory movement particularly well adapted to adjust the seat to the requirements of persons of different height and having different lengths of limb. In the seat of an automobile or other road vehicle, this is an important advantage in that it permits the occupant of the seat to adjust his eye level so as to obtain the best view of the road ahead, and also to attain a position in which he can rest his forearm comfortably on the side of the body.

I may employ any suitable means—such as a clamp or friction device—for locking the seat in the desired angular position, but a simple and convenient adjustment consists in providing two overlapping plates, one of which, 15, is attached to the base of the seat proper, and the other, 16, to one of the transverse members of the upper frame. Each plate is formed with ribs or depressions adapted to interfit mutually but so formed as to permit the plate 15 to slide over the plate 16 by simply swinging the seat about its pivotal axis, and any of the excrescences or ribs of one plate may be made to register with any of the recesses or grooves on the other plate, and a pin or bolt 17, preferably with a winged nut, indicated at 18, is secured to the fixed plate 16 and protrudes through an elongated slot 19 in the movable plate 15.

In order to fix the seat in its required angular position, it is tilted about its pivotal axis, and when the position is obtained the winged nut 18 is screwed down on the bolt 17.

Longitudinal adjustment of the seat is obtained by loosening the clamping screw 4 when the forward extensions of the longitudinal runners 1 are free to slide beneath the extremities of the bridge 5. The seat support may also be adjusted angularly about the bolt 4 and it should also be noted that the provision of a slot 20 in the bridge piece 5 permits the latter to follow any lateral movement of the runners 1, for the purpose of obtaining transverse adjustment.

I desire it to be understood that I do not limit the scope of my invention to the exact construction above described by way of example. For instance, I may employ leaf or plate springs or even pneumatic or rubber buffers in place of helical springs, and in some instances it may be convenient to locate the pivotal axis of the seat at the front or rear thereof and (or) at the front or rear of the upper frame. Any such modifications shall in no way be deemed to depart from the spirit of my invention.

I claim:

1. In a seat structure, the combination of a seat, a framework having transverse bearers connected by longitudinal members at their extremities, resilient supports connected to the transverse bearers and disposed between the junctions to the said longitudinal members, pivotal bearings on said longitudinal members, a pivotal axis member mounted in said bearings and connected to said seat, and means for adjusting the position of the seat angularly about its pivotal supporting axis.

2. In a seat structure the combination of a seat, a framework having transverse bearers connected by longitudinal members at their extremities, resilient supports connected to the transverse bearers and disposed between the junctions to the said longitudinal members, pivotal bearings on said longitudinal members, a pivotal axis member mounted in said bearings and connected to said seat, and means for adjusting the position of the seat angularly about its pivotal supporting axis, comprising in combination a fixed plate on the framework, a similarly formed plate attached to the seat and adapted to slide over the aforesaid fixed plate, and means for retaining one plate in a set position relatively to the other.

3. A seat structure having in combination a seat, a resiliently supported framework, pivotal means connecting the seat to the said framework, and means for adjusting the position of the seat angularly about its pivotal supporting axis, comprising in combination a fixed corrugated plate on the framework, a similarly formed plate attached to and depending from the seat and adapted to slide over the aforesaid fixed plate, a projecting pin member on one plate, a coöperating slot on the other plate, and clamping means on said projecting pin member for retaining one plate in a set position relatively to the other.

4. In a seat structure, the combination of a seat, a framework having transverse bearers connected by longitudinal members at their extremities, resilient supports connected to the transverse bearers, and disposed between the junctions to the said longitudinal members, pivotal bearings on said longitudinal members, a pivotal axis member mounted in said bearings and connected to said seat, and means for adjusting the position of the seat angularly about its pivotal supporting axis, comprising in combination a fixed corrugated plate on the framework, a similarly formed plate attached to and depending from the seat and adapted to slide over the aforesaid fixed plate, a projecting pin member on one plate, a coöperating slot on the other plate, and clamping means on said projecting pin member for retaining one plate in a set position relatively to the other.

5. A seat structure having in combination a seat, a pivotal supporting axis for said seat, a framework and bearings on said framework for said supporting axis, means for adjusting the position of the seat angularly about the said supporting axis, a base frame, resilient supporting means for said framework mounted on said base frame, means for securing said base frame to a floor surface, and means for adjusting the transverse and longitudinal position of said base frame on said surface.

6. In a seat structure the combination of a seat, a pivotal supporting axis therefor, a framework having transverse bearers connected by longitudinal members at their extremities and bearings for said pivotal axis on said longitudinal members, means for adjusting the position of the seat angularly about the said supporting axis, a base frame, resilient supporting means for said framework mounted on said base frame, means for securing said base frame to a floor surface, and means for adjusting the transverse and longitudinal position of said base frame on said surface.

7. In a seat structure the combination of a seat, a pivoted supporting axis therefor, a framework having transverse bearers connected by longitudinal members at their extremities and bearings for said pivotal axis on said longitudinal members, means for adjusting the position of the seat angularly about the said supporting axis, a base frame, resilient supports for said framework mounted on said base frame, connected to the transverse bearers of said framework, and disposed between the junction to said longitudinal members, means for securing said base frame to a floor surface, and means for adjusting the transverse and longitudinal position of said base frame on said surface.

8. In a seat structure, the combination of a seat, a pivotal supporting axis for said seat, a framework and bearings on said framework for said supporting axis, means for adjusting the position of the seat angularly about the said supporting axis comprising in combination a fixed plate on the framework, a similarly formed plate attached to the seat and adapted to slide over the aforesaid fixed plate, and means for retaining one plate in a set position relatively to the other, a base frame, resilient supporting means for said framework mounted on said base frame, means for securing said base frame to a floor surface, and means for adjusting the transverse and longitudinal position of said base frame on said surface.

9. In a seat structure the combination of a seat, a pivotal supporting axis therefor, a framework having transverse bearers connected by longitudinal members at their extremities and bearings for said pivotal axis on said longitudinal members, means for adjusting the position of the seat angularly about the said supporting axis, comprising in combination a fixed plate on the framework, a similarly formed plate attached to the seat and adapted to slide over the aforesaid fixed plate, and means for retaining one plate in a set position relatively to the other, a base frame, resilient supporting means for said framework mounted on said base frame, means for securing said base frame to a floor surface, and means for adjusting the transverse and longitudinal position of said base frame on said surface.

10. A seat structure having in combination a seat, a pivotal supporting axis for said seat, a framework and bearings on said framework for said supporting axis, means for adjusting the position of the seat angularly about the said supporting axis, comprising in combination a fixed corrugated plate on the framework, a similarly formed plate attached to and depending from the seat and adapted to slide over the aforesaid fixed plate, a projecting pin member on one plate, a coöperating slot on the other plate, and clamping means on said projecting pin member for retaining one plate in a set position relatively to the other, a base frame, resilient supporting means for said framework mounted on said base frame, means for securing said base frame to a floor surface, and means for adjusting the transverse and longitudinal position of said base frame on said surface.

In testimony whereof I affix my signature.

ALLIOTT V. ROE.